US011999668B2

(12) United States Patent
Merrell

(10) Patent No.: US 11,999,668 B2
(45) Date of Patent: Jun. 4, 2024

(54) DOUBLE DRUM SYSTEMS AND PROCESSES FOR CONVERTING BIOSOLIDS TO FERTILIZER

(71) Applicant: Merrell Bros, Inc., Kokomo, IN (US)

(72) Inventor: Terry Merrell, Kokomo, IN (US)

(73) Assignees: Terry Merrell, Kokomo, IN (US); Merrell Bros., Inc., Kokomo, IN (US)

( * ) Notice: Subject to any disclaimer, the term of this patent is extended or adjusted under 35 U.S.C. 154(b) by 0 days.

(21) Appl. No.: 17/220,994

(22) Filed: Apr. 2, 2021

(65) Prior Publication Data

US 2022/0315500 A1  Oct. 6, 2022

(51) Int. Cl.
*C05F 3/04* (2006.01)
*C02F 11/123* (2019.01)
(Continued)

(52) U.S. Cl.
CPC .............. *C05F 3/04* (2013.01); *C02F 11/123* (2013.01); *C02F 11/127* (2013.01); *C02F 11/13* (2019.01); *C02F 11/147* (2019.01)

(58) Field of Classification Search
USPC ........................................................ 210/732
See application file for complete search history.

(56) References Cited

U.S. PATENT DOCUMENTS 6,752,849 B2   6/2004  Logan
7,513,927 B2 *  4/2009  Faulmann ................ C05D 3/02
                                                          71/30
(Continued)

FOREIGN PATENT DOCUMENTS

WO    WO-2011060126 A2 *  5/2011  ............... C05C 1/00

OTHER PUBLICATIONS

IDS in U.S. Appl. No. 14/729,850, filed Jun. 3, 2015.
(Continued)

*Primary Examiner* — Ekandra S. Miller-Cruz
(74) *Attorney, Agent, or Firm* — FisherBroyles, LLp; Alastair Warr

(57) ABSTRACT

A system for converting biosolids to fertilizer comprising: a storage tank for holding biosolids; a conveyor operably connected to the storage tank for conveying the biosolids from the storage tank to a pressurized screener, wherein the pressurized screener selectively eliminates unwanted debris from the biosolids; a second conveyor operably connected to the pressurized screener to convey the biosolids to a centrifuge, the centrifuge operatively configured to remove water from the biosolids; a third conveyor operably connected to the centrifuge to convey the biosolids to a feeding chamber, a self-leveling conveyer position in the feeding chamber configured to deliver the biosolids to a nip feeder operatively positioned in the feeding chamber to selectively biosolids from the feeding chamber to a nip, wherein the nip is a gap between a first and second dryer drums; the first and second dryer drums operatively positioned to rotate and draw biosolids from the nip feeder into the nip, wherein a first and second scrapers are operably positioned to remove biosolids from the first and second dryer drums as they rotate, wherein the first and second dryer drums are selectively heated with steam provided by a boiler; a fourth conveyor positioned underneath the dryer drums to collect the biosolids after they pass through the nip and to convey the biosolids to a pelletizer configured to form the biosolids into pellets; a fifth conveyor operably connected to the pelletizer to convey the pellets to a cooling chamber.

11 Claims, 16 Drawing Sheets

(51) Int. Cl.
    *C02F 11/127*     (2019.01)
    *C02F 11/13*     (2019.01)
    *C02F 11/147*     (2019.01)

(56) References Cited

U.S. PATENT DOCUMENTS

| | | |
|---|---|---|
| 7,662,205 B2 | 2/2010 | Burnham |
| 7,771,699 B2 | 8/2010 | Adams |
| 8,192,519 B2 | 6/2012 | Burhnam |
| 8,470,065 B1 | 6/2013 | Burnham |
| 8,491,693 B2 * | 7/2013 | Burnham ................. C05F 9/00 71/33 |
| 8,562,793 B2 | 10/2013 | Novak |
| 8,714,467 B2 | 5/2014 | Lucas |
| 9,586,869 B1 | 3/2017 | Burnham |
| 9,751,813 B2 | 9/2017 | Merrell |
| 10,259,755 B2 | 4/2019 | Merrell |

OTHER PUBLICATIONS

Non-Final OA in U.S. Appl. No. 14/729,850 dated Jun. 28, 2016.
Final Rejection in U.S. Appl. No. 14/729,850 dated Aug. 22, 2016.
Non-Final OA in U.S. Appl. No. 14/729,850 dated Nov. 29. 2016.
Non-Final OA in U.S. Appl. No. 14/729,850 dated Apr. 3, 2017.
List of references cited by examiner in U.S. Appl. No. 15/658,611 dated Feb. 19, 2019.
From U.S. Appl. No. 14/720,850, the following: IDS filed on Jun. 16, 2015, including US and foreign references cited therein; list of references cited and considered by examiner dated Jun. 28, 2016; list of cited references by examiner and NPL submitted Nov. 29, 2016.

* cited by examiner

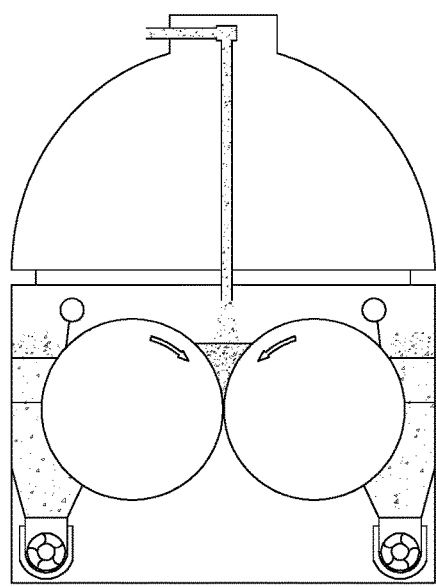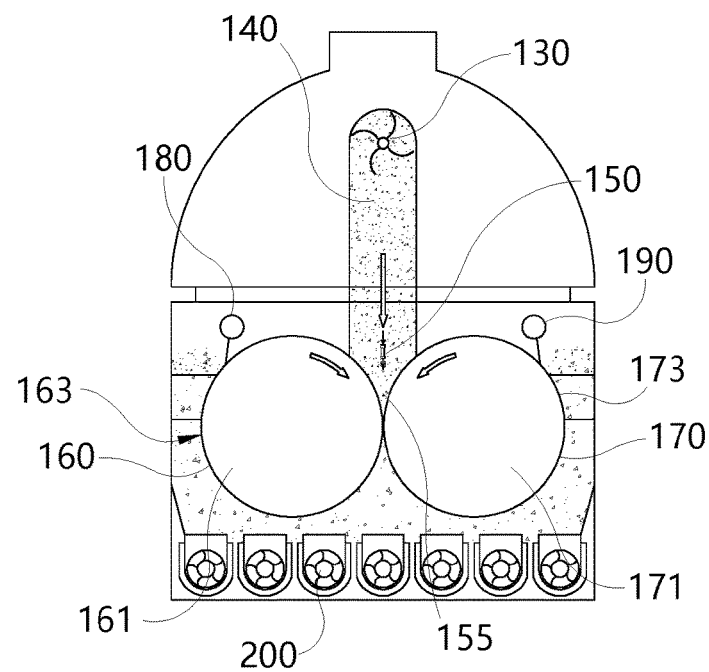
*Fig. 4a*  *Fig. 4b*

DOUBLE DRUM SYSTEMS AND PROCESSES FOR CONVERTING BIOSOLIDS TO FERTILIZER

BACKGROUND OF THE INVENTION

Biosolids comprise solid, semi-solid, or liquid residue generated during biological wastewater treatment process. Biosolids for beneficial use (i.e. land application or distribution) must be treated to reduce pathogens and vector attraction reduction ("VAR"). Insects, birds, rodents, and domestic animals may transport sewage sludge and pathogens to humans. Vectors are attracted to sewage sludge as a food source. VAR is a focus of federal regulation, e.g., 40 C.F.R. Part 503. VAR can be accomplished in two ways: by treating the sewage sludge to the point at which vectors will no longer be attracted to the sewage sludge or by placing a barrier between the sewage sludge and vectors.

After wastewater treatment, biosolids may be beneficially reused or disposed. Generally, biosolids are transported from wastewater treatment plants and beneficially reused in rural areas for application to farm fields. Alternately, biosolids are transported to a landfill for disposal. Large volumes biosolids create significant transportation expense. Wastewater sludge contains a relatively high percentage of water, and large volumes are created for reuse or disposal. The sludge also can create environmental and or health problems.

Federal, state, and local governments regulate the distribution and marketing of Class A biosolids. Class A biosolids represent the highest quality biosolids produced and may be used as fertilizer through commercial distribution. To achieve a Class A status, the biosolids must be treated to substantially eliminate pathogens and must meet stringent maximum concentration limits for heavy metals. Class A biosolids may be distributed in bulk or bagged for sale at retail centers. Class A biosolids may be marketed in different physical forms, and, like traditional commercial fertilizer, are not subject to site management restrictions if the product is registered as a fertilizer or distributed and marketed to a person or entity that will sell or give-away the biosolids (wholesale) or market biosolids products as a fertilizer (retail).

The United States Environmental Protection Agency's (EPA) Regulations recognize at least two classes as explained 40 C.F.R. Part 503. Class B pathogen reduction standards require a fecal coliform level of less than two million most-probable-numbers (MPN) per gram of total solids. Class A pathogen standards require fecal coliform densities less than 1,000 MPN per gram total solids and/or; *Salmonella* densities less than 3 MPN per four grams total solids. Enteric virus must be less than 1 plaque-forming unit per four grams of total solids. Helminths ova must be less than one viable helminths ova per four grams of total solids.

Traditionally, biosolids disposal involves transportation to rural areas and applying the sludge onto fields. This process increases health and environmental concerns. Other methods of disposal may include incineration, adding chemicals, or disposal into landfills. Concerns about contaminants, runoff, air pollution, tipping fees, and rising transportation costs have resulted in cities and municipalities seeking alternate and more efficient methods to remove of biosolids.

Double drum dryers have been used to dry biosolids. Historically, limitations regarding the moisture content and throughput (volume of biosolids to be processed into fertilizer measured gallons per day or dry tons per day) of the biosolids negatively impacted efficient processing using a double drum dryer. The biggest limitation has been the ability of the biosolids to enter the nip between the two rotating drums. Double drum dryers have been limited in the percent (%) solids or thickness that they can process by the ability of the biosolids to flow through the nip area between the drums. If the biosolids were too dry, they would bridge between drums and not enter the nip area. Consequently, double drum dryers could only process biosolids that would flow, e.g., biosolids with no more than about 15% solids.

Typically, biosolids are sprayed with a pendulum slurry feed system or pumped into the nip as a liquid. If the biosolids are too stiff or dry, they will bridge over the nip and not effectively pass through the nip. Because the double drums rotate without throughput falling into the nip, the drying process becomes uneconomical. The prior art operational limits are restricted to product that is fluid enough to flow. If the product was not fluid enough to slip into the nip, water would be added first to liquefy the product so that it could be processed. This defeats the purpose of drying the biosolids and reduces throughput.

SUMMARY OF THE INVENTION

The systems and processes of the claimed invention combine pre-screening, chemical flocculation, dewatering, double drum steam impulse drying, and flash evaporation to dry and shrink the volume of biosolids, pasteurizing the biosolids, pelletizing, and cooling for distribution as fertilizer. Optionally, additional fertilizer, water absorbent granular polymer, or both, may be added to the pellets to promote drought durability for the crop that is fertilized. The disclosed systems and processes solve the problems in the field of endeavor related to the decreased flowability of drier biosolids and allows it to pass efficiently through the nip. This increases efficiency and productivity of the double drum drying process. Thus, the disclosed inventions make it more economical to operate in terms of time, money, energy, and other resources.

A feeding chamber comprises a novel nip feeder to solve the problems in the art relating to feeding the biosolids into the nip. In the feeding chamber, positioned above the double drums in the dryer component, a conveyor transports biosolids into the nip feeding chamber. A novel nip feeder, positioned at the bottom of the feeding chamber, feeds biosolids into the nip between two rotating drums thereby eliminating or reducing the bridging of biosolids in the feeding chamber. Although this description focuses on one double drum dryer comprising two rotating drums, a person of skill in the art will appreciate that more than one set of dryer drums could be used within the scope of this invention.

Further embodiments, forms, objects, features, advantages, aspects, and benefits shall become apparent from the following description and drawings.

BRIEF DESCRIPTION OF THE DRAWINGS

FIG. 4a shows a schematic layout of a prior art double drum dryer.

FIG. 4b shows a schematic layout of the novel double drum dryer.

DESCRIPTION OF ILLUSTRATIVE EMBODIMENTS

This description provides contemplated modes of carrying out embodiments of the invention. The description illustrates the general principles of the inventions without limiting their scope.

Most biosolids from wastewater treatment plants comprise a slurry. The concentration of solids typically ranges from 1-8% solids (92-99% moisture). Wastewater will typically comprise a large volume of water and a small volume of solids. Typically, 99% of what comes into a wastewater plant is water. This water is usually treated biologically and discharged into a nearby stream or water body. The remaining 1% that consists of solids is separated and treated independently. Commonly, the treatment process for these solids includes either aerobic or anaerobic digestion. In anaerobic digestion, a tank is used which is heated to about 95°-98° F. This causes the solids to start digesting without the introduction of additional air. Aerobic digestion involves adding air to the solids. Aerobic digestion comprises using a tank that has continuous air injected in it to digest the biosolids. Both options are expensive and require energy and maintenance. The inventions disclosed and claimed herein eliminate the need for aerobic or anaerobic digestion.

Figure 1:
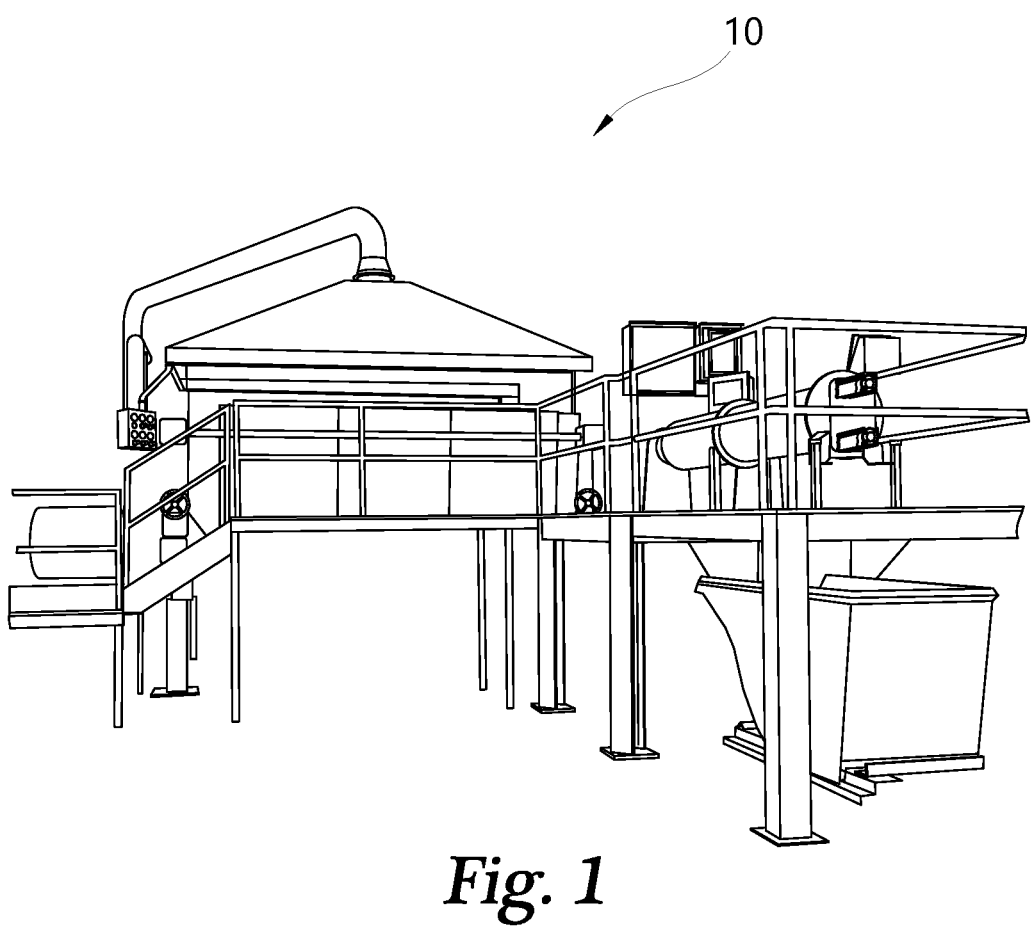
FIG. 1 shows a perspective view of a double drum dryer plant.
Figure 2:
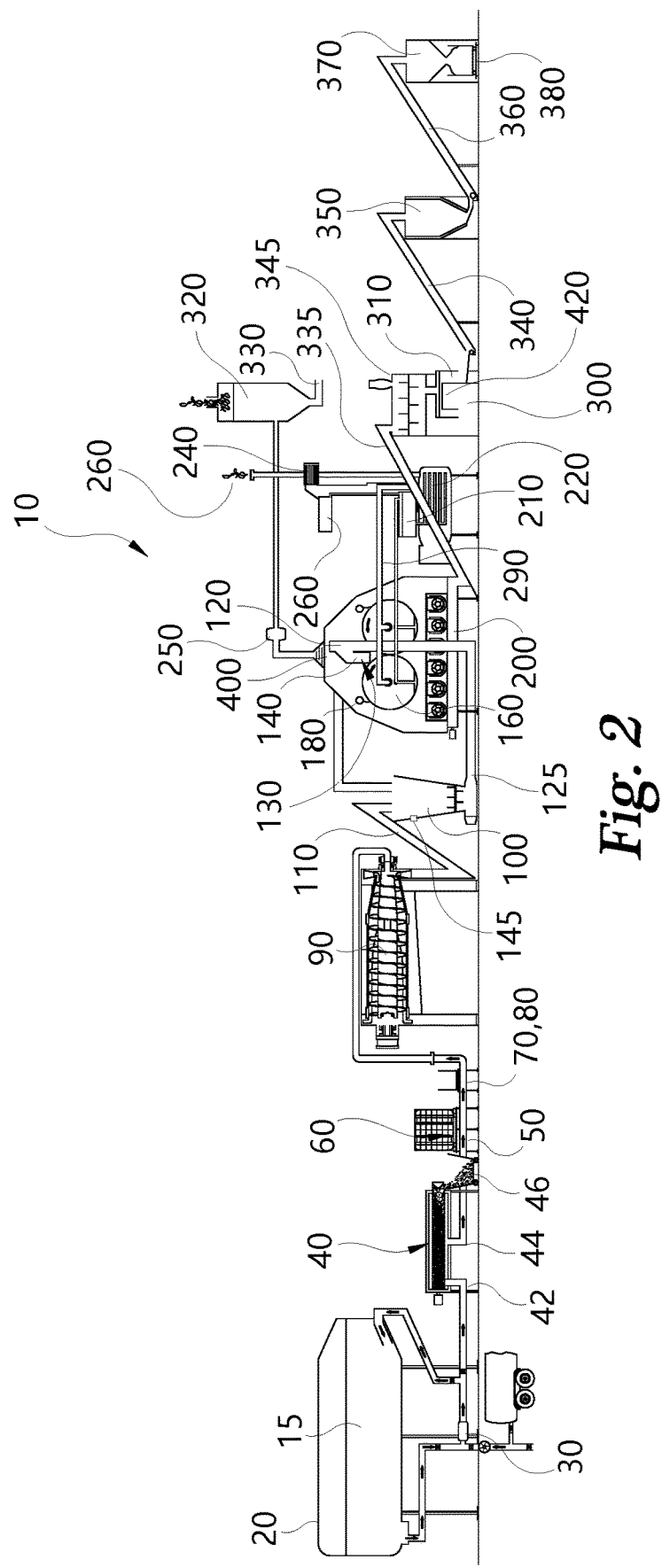
FIG. 2 shows a schematic layout of the double drum drying system.

Referring to FIGS. 1 & 2, the biosolids converting system 10 is shown. The system 10 comprises a liquid sludge storage 20, a first pump 30, a pressurized screener 40, a polymer 50, a polymer tote 60, a polymer tank 70, a polymer pump 80, a centrifuge 90, a first storage hopper 100, a first conveyor 110, a second vertical conveyor 120, a second horizontal leveling conveyor 130, a feeding chamber 140, a nip feeder 150, first and second drum dryers 160, 170, first and second scrapers 180, 190, a third live bottom conveyor 200, a boiler feedwater tank 210 (FIG. 15), a boiler 220, a de-aerator 230, an economizer 240, a venturi 250, a boiler exhaust 260, a, a drum condensate return 290, holding/mixing chamber 345 an optional belt dryer 300, a pelletizer 310, a chemical scrubber 320, a slurry return conduit 330, a fourth conveyor 340, a pellet cooler 350, a fifth conveyor 360, a second hopper 370, scales 380 a vapor hood 400. Other elements are identified infra.

Figure 3:
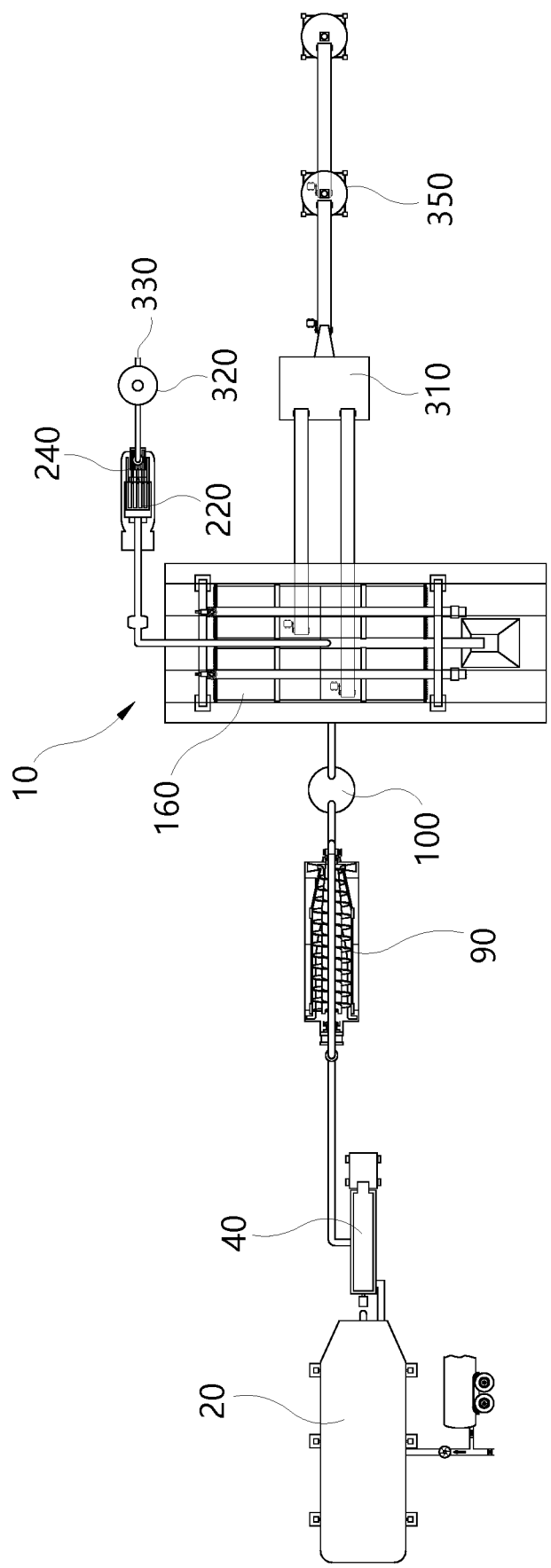
FIG. 3 shows a top view of the double drum dryer system.

Referring to FIG. 3, biosolids 15 are delivered to the system 10 by truck or other means (not shown). The biosolids 15 are stored in sludge storage 20. The sludge storage 20 allows for continuous mixing of the biosolids 15. A first pump 30 delivers the biosolids 15 to a pressurized screener 40. The screener 40 separates debris that is larger than about 2 mm in diameter. The screener 40 must be pressurized because it is self-cleaning. The screener 40 has a first side 42 and a second side 44 and measures the pressure on both sides 42, 44 using a pressure sensor (not shown). If the pressure differential between first and second side 42, 44 reaches a predetermined threshold, an automatic cleaning function starts and cleans the first and second sides 42, 44 until the pressure differential returns below the predetermined threshold. This screening process ensures that no large debris makes it to the first and second dryer drums 160, 170 where such debris may cause damage. The screened debris is discharged into a dumpster (not shown) and hauled to a landfill.

Centrifuge 90 removes water from the biosolids. The screened biosolids 15 are pumped to centrifuge 90. Alternately, the dewatering may be accomplished with a belt press (not shown), a screw press (not shown), or other similar devices known in the art. While being pumped from the screener 40 to centrifuge 90, a polymer 50 may be injected into the biosolids 15. The polymer 50 causes the Biosolids to "flock". This flocking process aids in the separation of the solids from the water. In the case of the centrifuge 90, the specific gravity is magnified, which causes the water to separate from the solids more efficiently and exit the centrifuge 90 at 20-30% solids (70-80% moisture). The centrate, or water that is separated from the centrifuge, is discharged back into the wastewater plant and after further treatment is discharged.

Suitable polymers include for example, those available from Polydyne, BASF, and Solenis. The polymer 50 may be delivered to the polymer tanks 70 using polymer tote 60. Polymer pump 80 delivers the polymer 50 to the biosolids 15 at a desired volumetric rate over a desired time of delivery. In one preferred embodiment, the volume of polymer added to the biosolids is within the range of about 2 lbs. per dry ton to about 90 lbs. per dry ton. The precise volumetric amount depends on the type of biosolids being processed. The dewatering process thickens the biosolids 15 to approximately 20-30% solids (70-80% moisture) by weight. The biosolids are then delivered to a first conveyor 110.

Referring to FIG. 2, a first conveyor 110 transports the biosolids 15 to hopper 100. A second conveyor 125 transports the biosolids 15 to vertical conveyor 120 that in turn delivers biosolids 15 to a horizontal leveling conveyor 130 that in turn delivers biosolids to a feeding chamber 140. The first conveyor 110 and second conveyor 125, vertical conveyor 120 may comprise a shaftless conveyor, a loop screw conveyor, or other equivalent devices. Once the biosolids 15 are in feeding chamber 140, they will pass into nip feeder 150 that delivers biosolids 15 to the nip gap 155 between the first and second dryer drums 160, 170. While two dryer drums 160, 170 are shown, any number of dual drums may be employed to practice the disclosed inventions.

Conveyer 130 may be a self-leveling ribbon screw conveyor or other similar system. The nip feeder 150, positioned at the bottom of the feeding chamber 140, delivers biosolids 15 through the nip 155 to the rotating dryer drums 160, 170 and eliminates bridging in the feeding chamber 140 on the upward stroke. The gap of the nip 155 is selectively sized depending on the product being processed and the desired throughput. In one embodiment, the nip 155 is sized from about 0.1 mm to about 0.4 mm.

Figure 5:
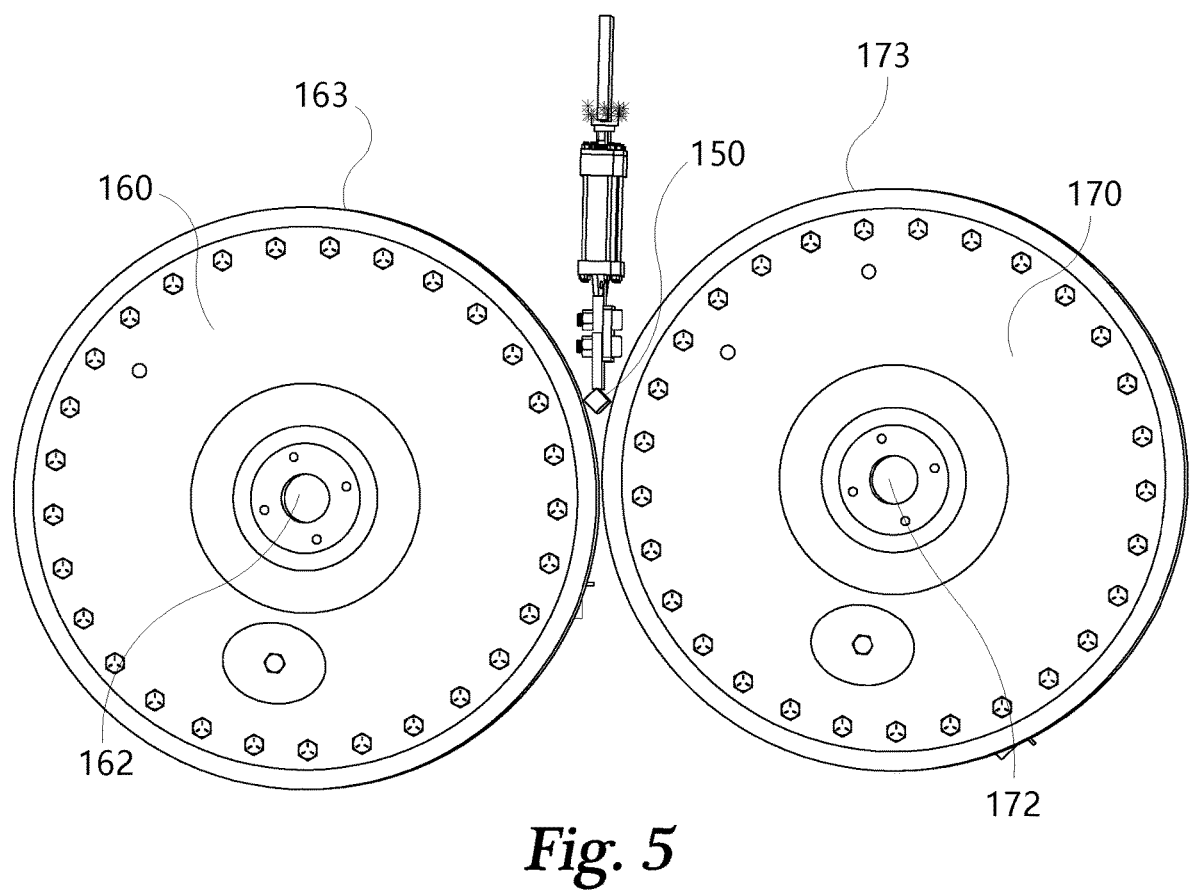
FIG. 5 shows an end view of the double drum dryer and nip.
Figure 6:
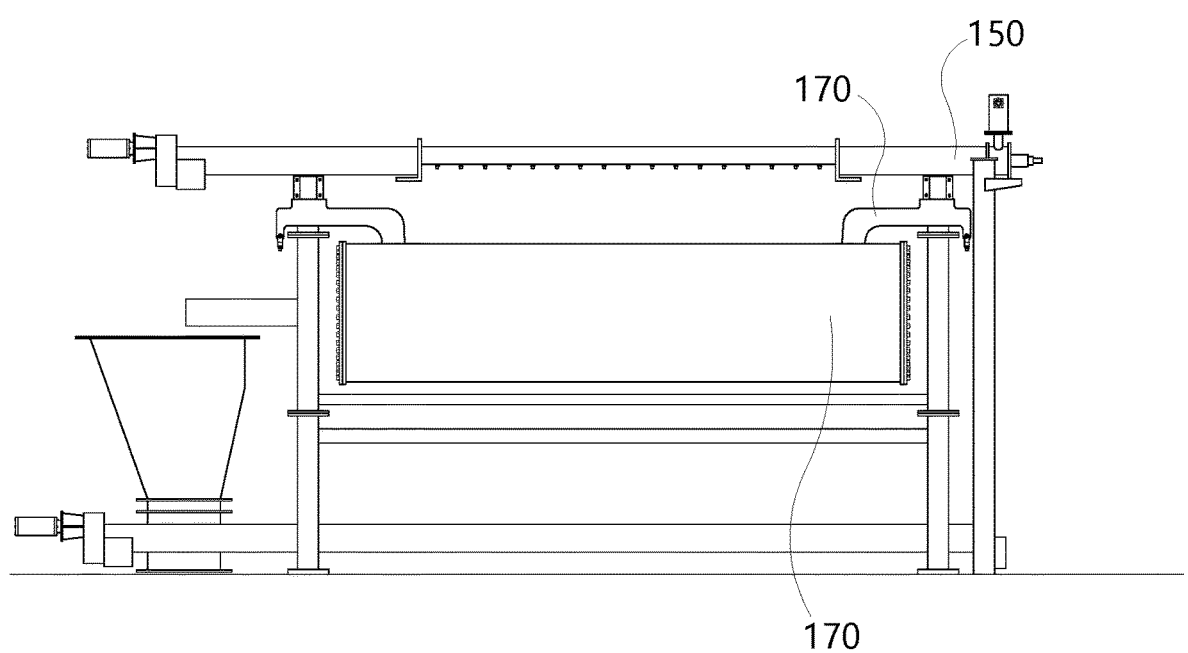
FIG. 6 shows a side view of the double drum dryer.

This invention overcomes that problem and can process a higher throughput of Biosolids than other systems known in the field. This is accomplished by doing two things. Referring to FIGS. 4 and 5, first, feeding chamber 140 is a minimum of about 10" wide and about 24" tall. Once filled with biosolids 15, this total volume and height exerts between 0.433 and 1 lb. of head pressure on the nip 155. Second, nip feeder 150 pulses up and down to feed biosolids 15 into nip 155. As the nip feeder 150 moves down, it pushes the biosolids to allow nip 155 to contact biosolids 15 and pull them through and deliver them to dryer drums 160, 170.

As the nip feeder 150 pivots away from nip 155, it displaces biosolids 15 and causes biosolids 15 to move around and fill the void under the nip feeder 150 therefore refilling it for the next downward movement.

Feeding chamber 140 stores biosolids 15 ready to process above dryer drums 160, 170. Second conveyor 125 transports the biosolids generally horizontally from the first hopper 100 to the vertical conveyor 120 to horizontal leveling conveyor 130 to feeding chamber 140. The biosolids are unloaded into a self-leveling ribbon screw conveyor 130 that drops the biosolids into the feeding chamber 140. The self-leveling ribbon screw conveyor 130 operates at a speed that will transport more biosolids than can be processed. The excess biosolids 15 exit the opposite end of the dryer and discharge back into first storage hopper 100.

Referring to FIGS. 6-9, the nip feeder 150 is powered by at least one hydraulic ram 151 (FIG. 10) on each end of the dryer. Hydraulic rams 151 combined with a double rail alignment system 152 must be used to keep the timing sequence equal on both ends of the nip feeder 150. If air cylinders are used, air will compress, making it possible that each end of the nip feeder will not go up and down in rhythm with each other, and potentially damage the feeder or shorten the lifespan. The design of the nip feeder 150 keeps the hydraulic cylinders which power the feeder out of the harsh drying and boiling environment.

The main bar 153 on the nip feeder 150 provides stability and minimum horizontal "flexing" across the drums. The nip feeder 150 promotes rolling of the biosolids on the upward motion which encourages the biosolids to roll each direction and fall into the nip 155 thereby refilling the nip 155 for the next downward stroke. The up and down motion of the nip feeder 150, combined with the head pressure, feeds the biosolids down into the "grab" zone. The grab zone is the point in the nip 155 where the pulling action of the rotating drums grabs the biosolids and pulls it in. The nip feeder 150 may provide a maximum stroke of up to about 5 inches, which may be selectively adjusted as desired. The nip feeder 150 pivots up and down and its speed is adjustable by a variable frequency drive controller.

Figure 7:
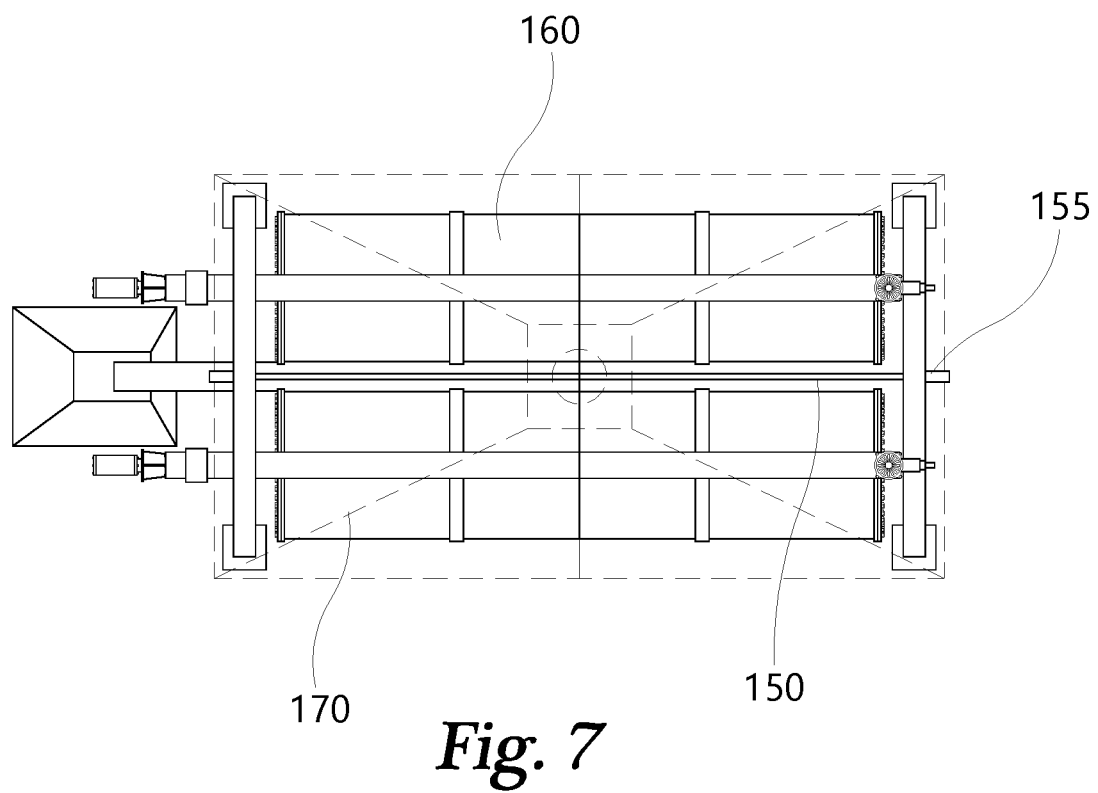
FIG. 7 shows a top view of the double drum dryer.
Figure 8:
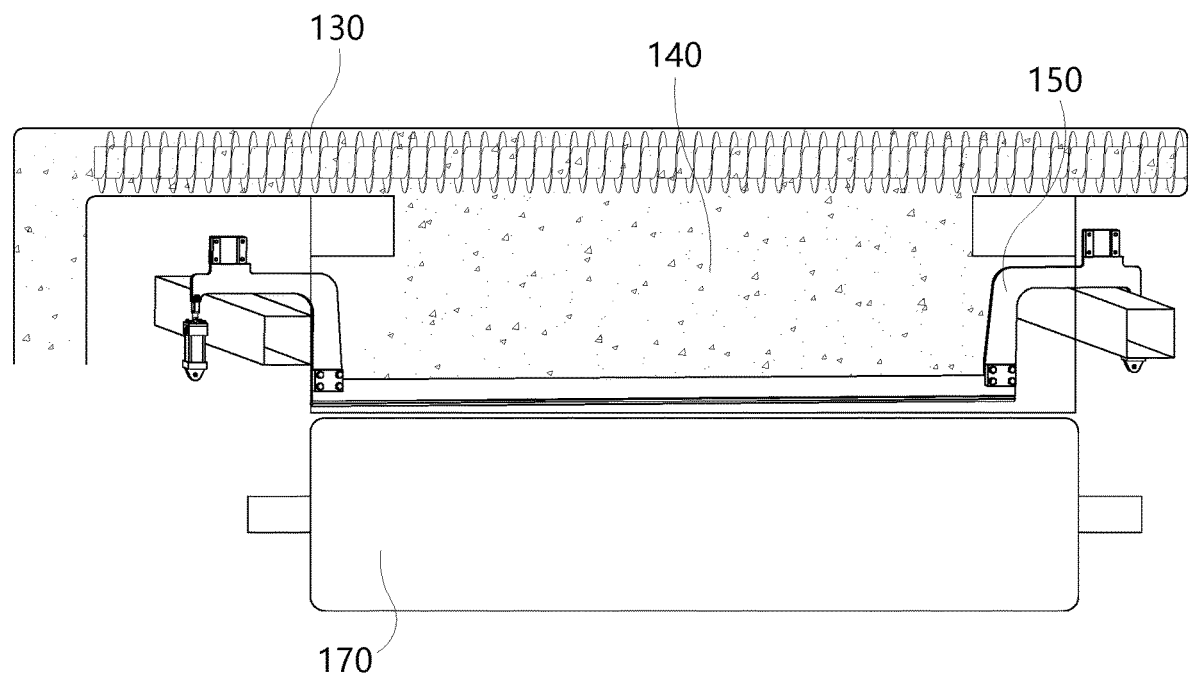
FIG. 8 shows a side view of the double drum dryer.
Figure 9:
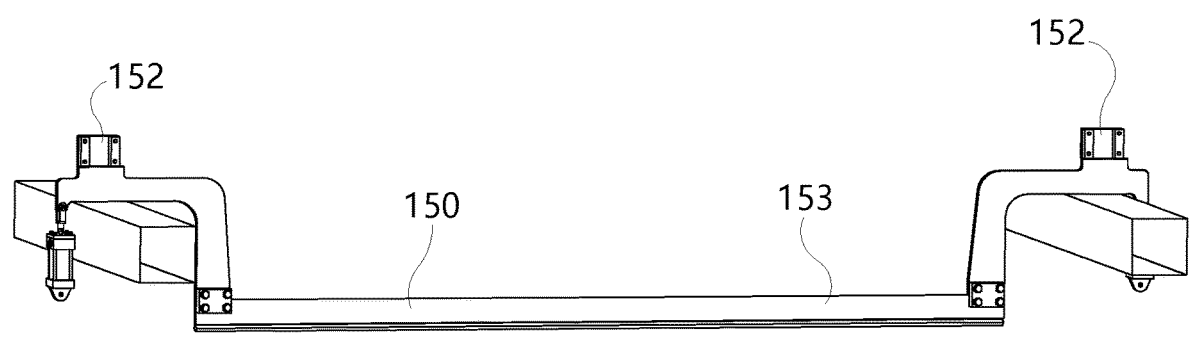
FIG. 9 shows a perspective view of the nip feeder.
Figure 10:
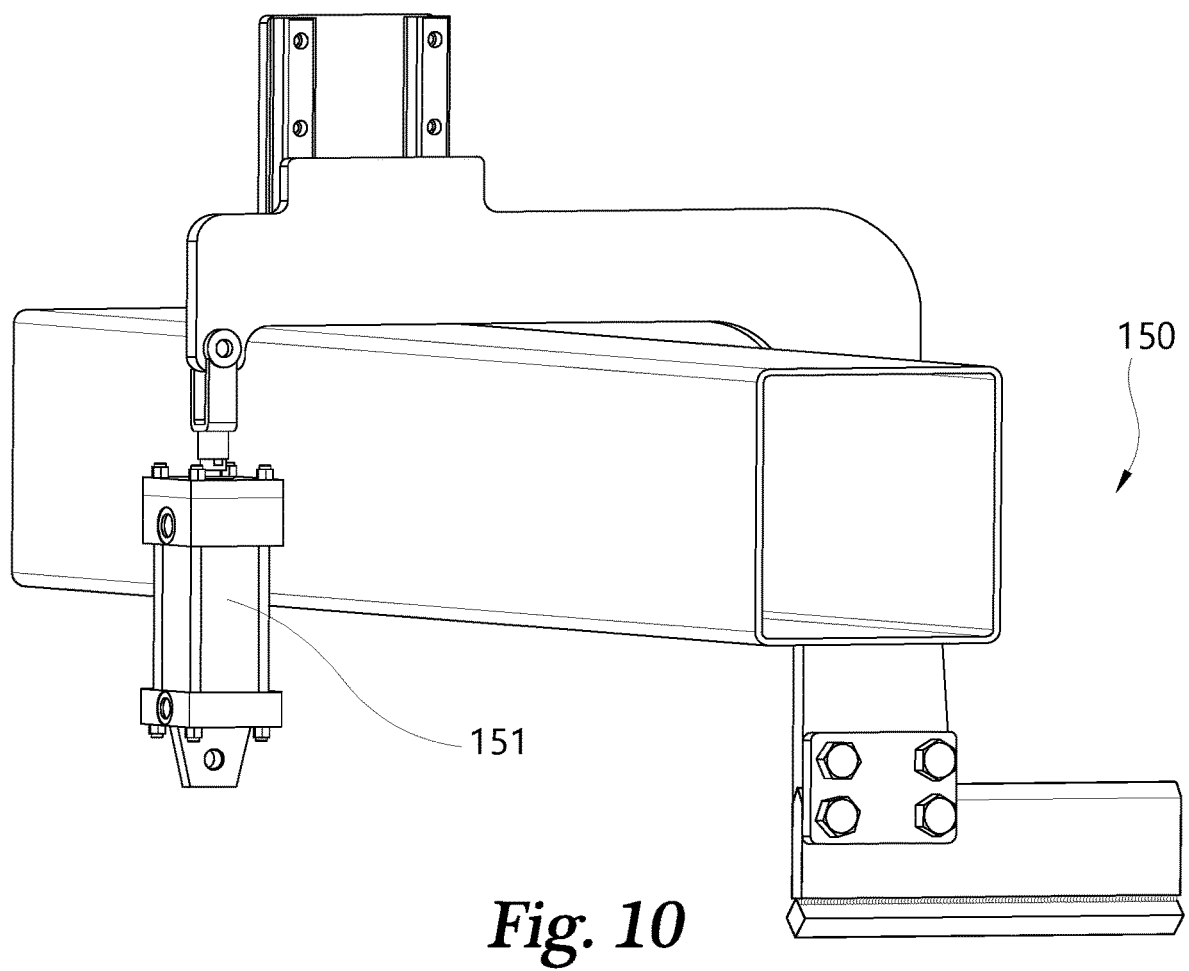
FIG. 10 shows the nip feeder attached to hydraulic ram and rail.
Figure 10A:
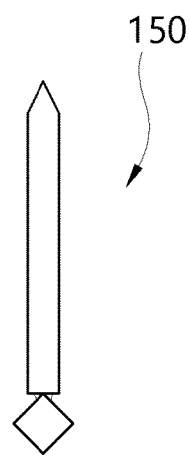
FIG. 10a shows an end view of the nip feeder.
Figure 10B:
FIG. 10b shows a top view of the nip feeder.
Figure 11:
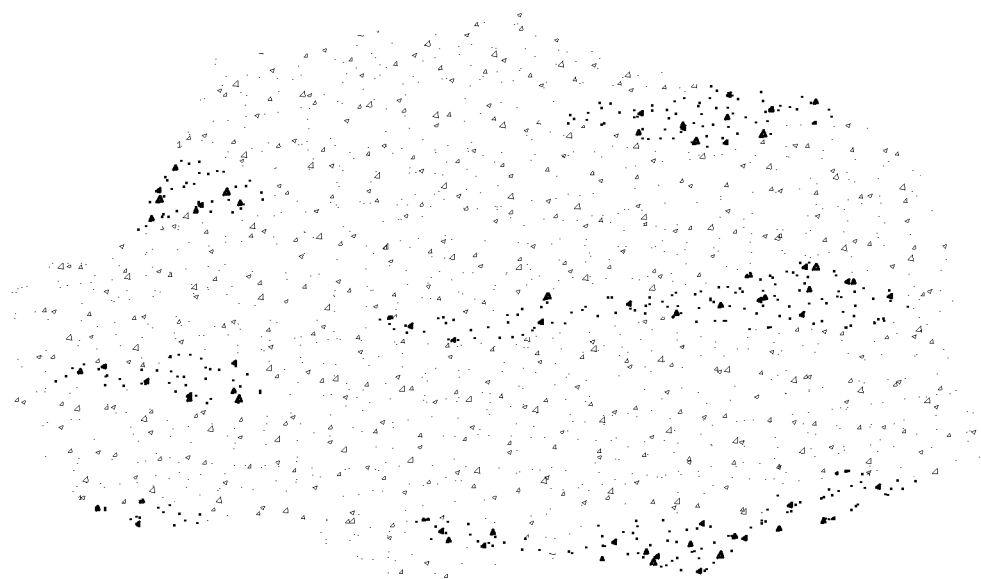
FIG. 11 shows bulk fertilizer.
Figure 12:
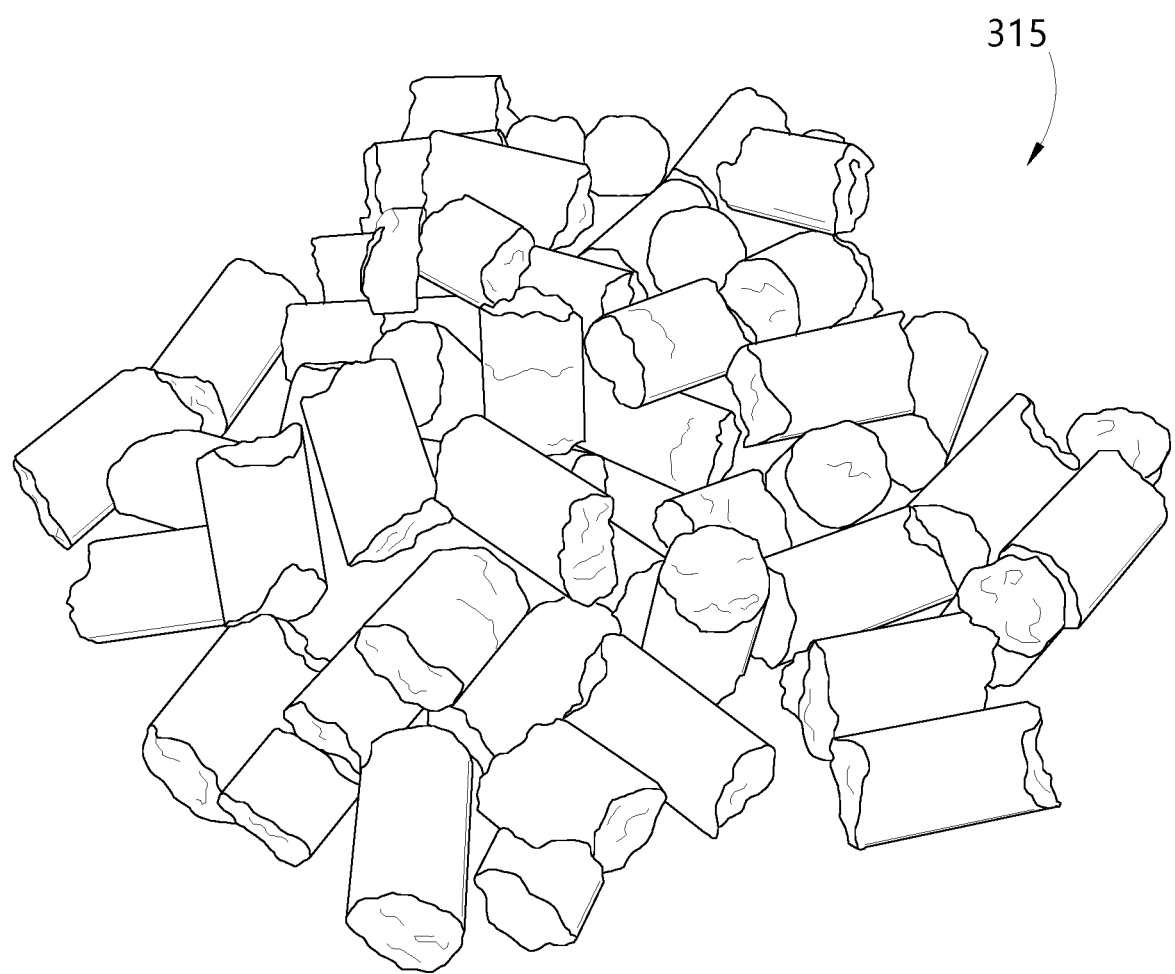
FIG. 12 shows pellet fertilizer.

Referring to FIGS. 10-10c and 7, the nip feeder 150 is edge cut to allow the top of the nip feeder 150 to move away from dryer drums 160, 170 to minimize the upward flow of the biosolids while dispersing the biosolids radially and downwardly toward the nip to be introduced to the space between dryer drums 160, 170. The nip feeder 150 ensures the correct pressure is applied to feeding the nip 155. If too much pressure is applied, the biosolids are force fed through the nip 155 at a pace that pushes it out the other side without being fully dried. The nip feeder 150 eliminates such dispersion and ensures biosolids 15 are effectively processed.

Referring to FIGS. 4b and 5, dryer drums 160, 170 have interior compartments 161, 171 and rotate around axes 162, 172 in opposite directions to draw biosolids 15 between outer surfaces 163, 173. First and second scrapers 180, 190 (FIG. 4b) are positioned proximate to the outer surfaces 163, 173 to allow them to remove biosolids 15 that may adhere to outer surfaces 163, 173.

Referring to FIGS. 2 and 4b & 3, a boiler 220 draws water from feedwater tank 210 and creates steam that is injected into interior compartments 161, 171 of dryer drums 160, 170 at pressure ranging from 75-125 pounds per square inch gauge ("Psig"). The steam raises the temperature of the dryer drums 160, 170 so that their outer surfaces 163, 173 reach temperatures of about 300° F. or higher. Alternatively, natural gas, liquid propane gas, or other suitable fuel may be used to heat dryer drums 160, 170. Before biosolids 15 pass through the nip feeder 150, they are positioned at the top of dryer drums 160, 170. The heat of dyer drums 160, 170 will pass to biosolids 15 and heat biosolids 15 to remove some water therefrom.

Boiled and evaporated flash water is selectively removed through a venturi 250 to limit condensation. The biosolids 15 may adhere to outer surfaces 163, 173 of dryer drums 160, 170 and continue to dry as dryer drums 160, 170 rotate about axes 162, 172 respectively. First and second scrapers 180, 190 remove biosolids 15 off outer surfaces 163, 173. Dryer drums 160, 170 continue to rotate to collect and dry additional biosolids 15 introduced through nip feeder 150.

If a higher level of throughput is desired, the nip 155 may be widened, the rotational speed of dryer drums 160, 170 may be increased, or both. The exiting biosolids 15 will not be as dry but the throughput volume will increase. The % solids can be as low as 50%. The biosolids 15 may then be sent to a fueled pasteurization drying system such as a belt dryer 300 as disclosed in U.S. Pat. No. 9,751,813 and 10,259,755 that are incorporated herein by reference.

At the bottom of the first storage hopper 100, a second conveyor 125 transports biosolids 15 to a vertical conveyor 120 that transports the biosolids 15 to a fourth horizontal self-leveling conveyor 130 which transports the biosolids to a feeding chamber 140. Conveyors 120, 125 may be screw conveyor, shaftless screw conveyors, or other variations known in the art. The feeding chamber 140 is positioned above the dryer drums 160, 170 and spreads biosolids 15 over the outer surfaces 163, 173. Preferably, the biosolids are delivered as evenly as possible over the available surface of the rotating drums.

Conveyors 120, 125, 130 may transport more biosolids 15 than the feeding chamber 140 can hold. The excess biosolids 15 exit the opposite end of the feeding chamber 140 and are discharged back to storage hopper 100. This always allows the system 10 to operate at about 100% capacity. It also creates an ease of operation for the operator. A level sensor 145 operatively connected with feeding chamber 140 may continuously read the level of biosolids 15 in storage hopper 100. This signal may be operatively connected to a programmable logic control ("PLC") that regulates the volume at rate of biosolids 15 coming from the centrifuge 90 depending on the level of biosolids 15 in the hopper 100 or feeding chamber 140. Thus, the system becomes self-calibrating.

Once the biosolids 15 have been pulled into the nip feeder 150, pressure applied to biosolids 15 may be increased while the temperature from dryer drums 160, 170 transfers to and heats biosolids 15. Under pressure greater than atmospheric pressure, the boiling point of the biosolids 15 increases as a basic law of physics. This process is known as Impulse Drying. As biosolids 15 exit the nip 155 and the pressure drops to atmospheric, the biosolids 15 boil and flash evaporate. This reaction causes some of the water in biosolids 15 to "Flash" before it has time to boil. This phenomenon reduces the amount of thermal energy that would normally be needed.

Once biosolids 15 pass through the nip 155, a majority adheres to the surfaces 163, 173 of dryer drums 160, 170 and continue drying as dryer drums 160, 170 rotate. Scrapers 180, 190 remove biosolids 15. Some biosolids 15 may separate from dryer drums 160, 170 due to centrifugal force. A live bottom screw auger 200 (FIG. 2), 470 (FIG. 4b) positioned below dryer drums 160, 170 collects biosolids 15. Once scrapers 180, 190 remove remaining biosolids 15 from the surfaces 163, 173, said surfaces are substantially clean and continue rotating around to the nip 155 to continue drying additional biosolids 15 delivered through nip 155.

Figure 13:
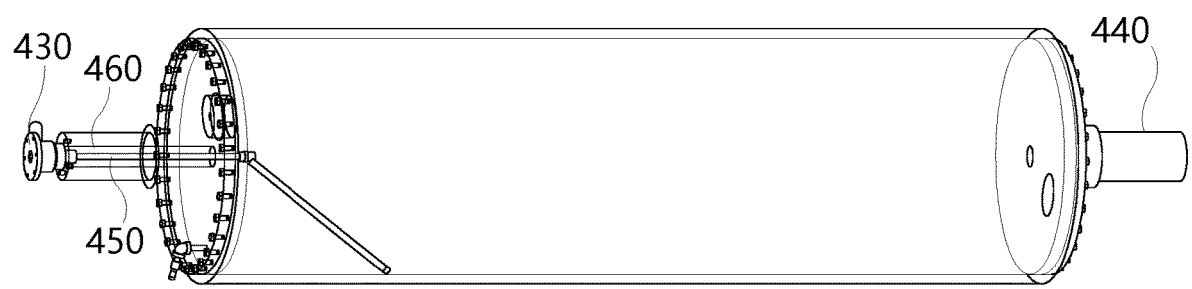
FIG. 13 shows a side view of the rotary joint syphon.

Positioning biosolids 15 above dryer drums 160, 170 allows heat to dissipate from the outer surfaces 163, 173 to biosolids 15. This process causes the steam inside dryer drums 160, 170 to cool and condense. The resultant hot water inside dryer drums 160, 170 needs to be removed. Referring to FIG. 13, a rotary joint 430 is positioned proximate the journal 440 of dryer drums 160, 170 that has a first pipe 450 positioned within a second pipe 460. A person of ordinary skill in the art will appreciate that the diameter of first pipe 450 is sufficiently smaller than the diameter of second pipe 460 to allow first pipe 450 to be positioned within second pipe 460 generally concentrically. The first pipe 450 extends to the bottom of dryer drums 160, 170, usually within one inch of the bottom of dryer drum 160, 170. The steam pressure inside dryer drums 160, 170 pushes the condensed water back up the first pipe 450 and out of dryer drums 160, 170.

Figure 14:
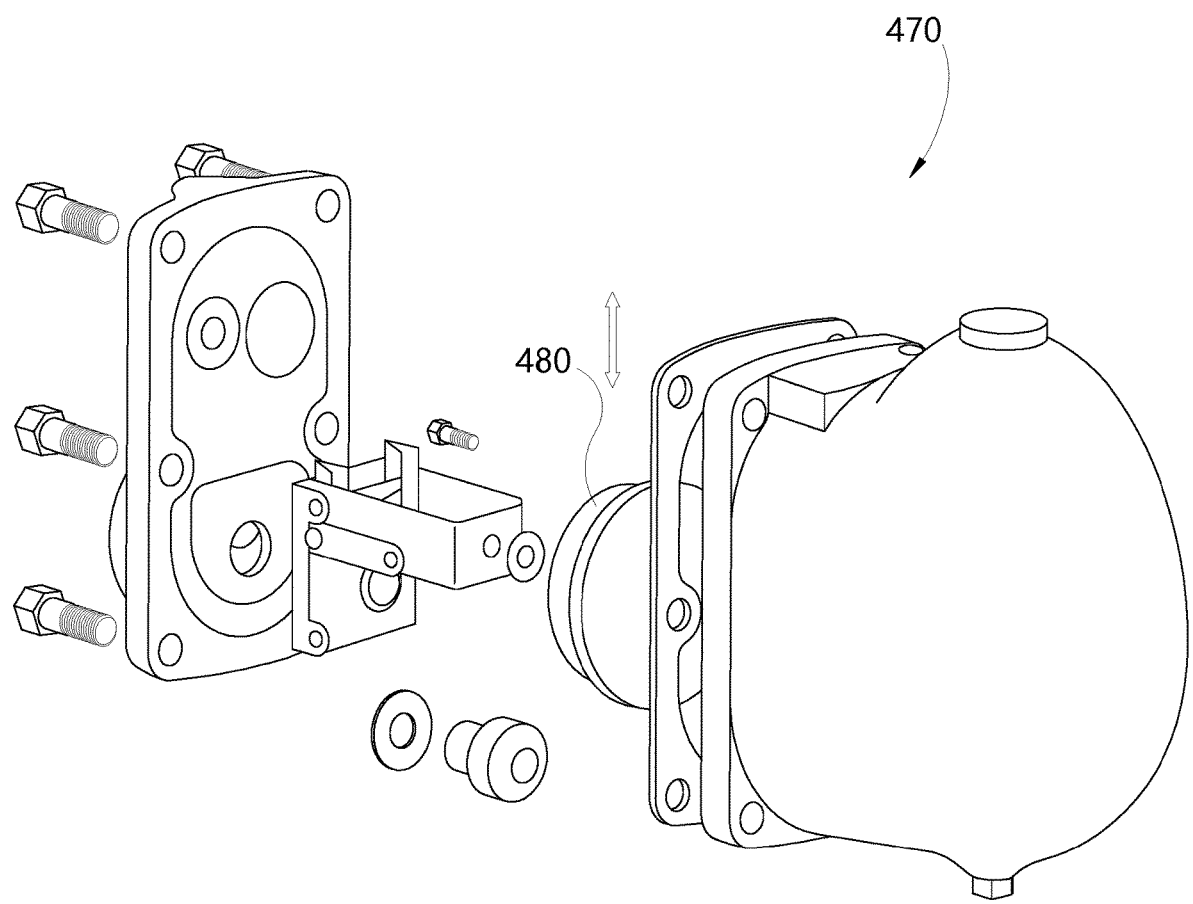
FIG. 14 shows an exploded view of the bucket trap.
Figure 15:
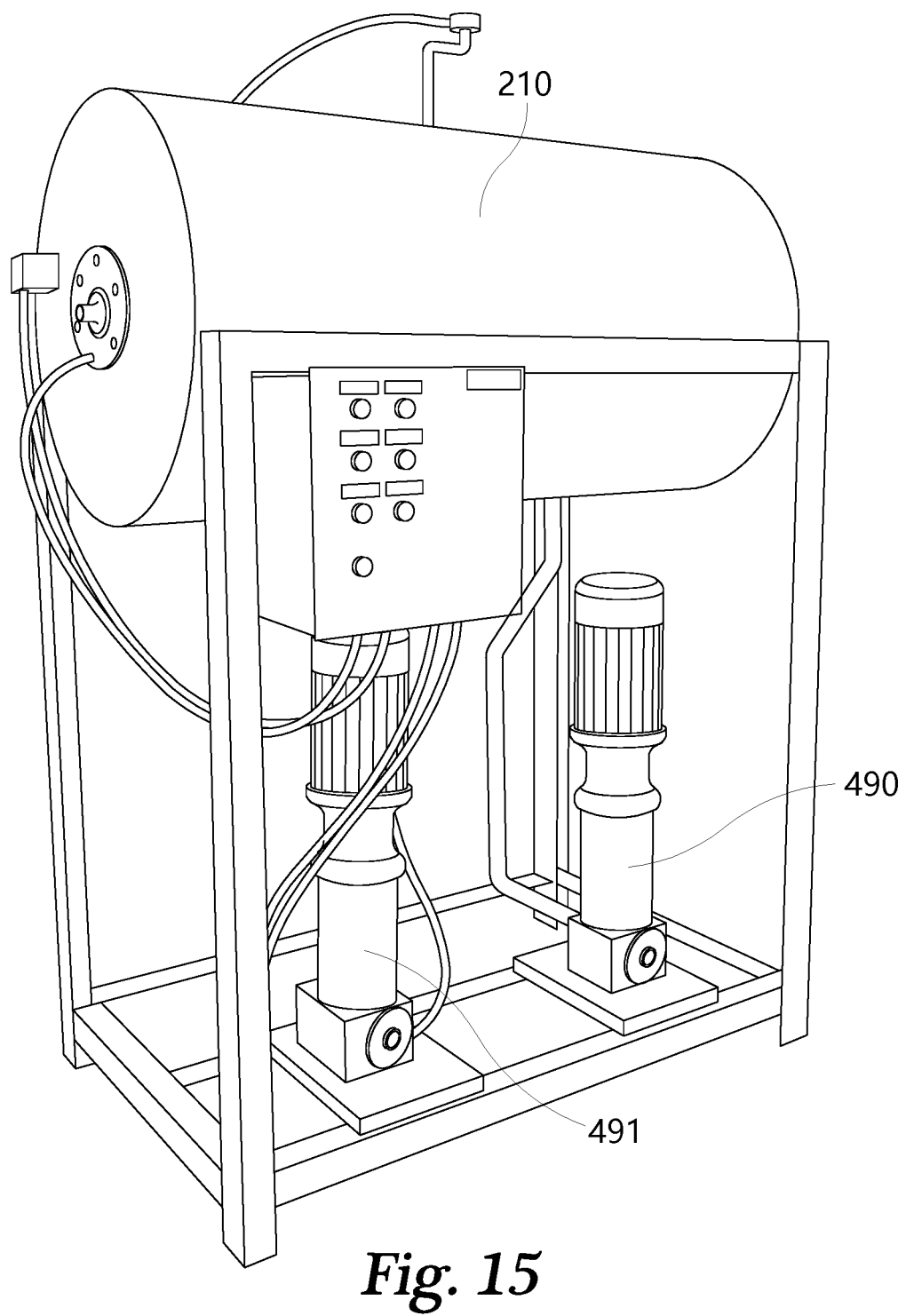
FIG. 15 shows a perspective view of the feedwater tank.

Referring to FIG. 14, the water is piped to a bucket trap 470 that uses a float 480 to remove the hot water while keeping the steam inside dryer drums 160, 170. This hot water is then transported to an insulated feedwater tank 210 (FIG. 15). The temperature of this water can range from 200°-211° F. When the boiler 220 calls for more water to boil, a second pump 490 operably connected to the feedwater tank 210 pumps hot water back to the boiler 220 usually at temperatures reaching 200°-211° F. In an alternate embodiment, second pump 491 serves as a redundant backup to pump 490. As the water is being pumped back, it goes through an economizer 240 operatively connected to boiler 220 wrapping around the boiler exhaust 260. This allows the water to absorb heat from exhaust 260 and then enter the boiler 220 at a temperature close to boiling, i.e., 212° F. to generate more steam.

The dryer drums 160, 170 are substantially enclosed and operated under a vapor hood 400. Vapor hood 400 pulls steam and flashed water out of dryer drums 160, 170 before cooling to condensation. Vapor hood 400 may comprise a variable frequency drive controlled 3,000 cfm fan or another similar device. The air flow is then processed through a venturi 250 and/or chemical scrubber 320 to capture contaminants and odor before discharge.

Once the biosolids 15 leave dryer drums 160, 170, a third conveyor 335 transports biosolids 15 to holding/mixing chamber 345. Holding/mixing chamber 345 is positioned above shafted reversing screw auger 420. When auger 420 is running in reverse it may optionally transport biosolids 15 to a belt dryer 300 for further drying. When running in forward position, auger 420 transports biosolids to pelletizer 310 where biosolids 15 are formed into pellets 315.

Optionally, pellets 315 may be spiked with a desired recipe in the mixing chamber 345 Fertilizer chemicals such as Nitrogen, Potash, Phosphorus, or Lime may be added to the pellets 315 at desired concentrations to provide the fertilizer with a desired material composition. Alternatively, water absorbent polymer 50 may be added. This allows selected customization of the chemical content of pellets 315 depending on the desired application. The addition of the water absorbent polymer is unique in that this polymer can hold up to 200 times its weight in water. The spiked pellets 315 can be planted underneath agricultural seeds to provide the desired supply of nutrients and a reservoir of water to help during dry times of the year. This ability is allowed by using naturally occurring lignin in biosolids 15 to help bind or pelletize the polymer and additional fertilizer. Lignin is a class of complex organic polymers that form key structural biosolids in the support tissues of most plants. Lignans are particularly important in the formation of cell walls, especially in wood and bark, because they lend rigidity and do not rot easily.

This invention seeks to eliminate the need for either type of digestion. This invention takes the raw waste and within minutes transforms the solids into a Class A biosolids without any digestion required, thereby saving the user money and other resources.

The dried biosolids 15 removed from dryer drums 160, 170 fall into a third conveyor 335 that conveys the biosolids 15 to a holding/mixing chamber 345. The third conveyor 335 may comprise a screw auger system. Inside the holding/mixing chamber 345, the biosolids 15 fall into reversable auger 420. In one direction, the reversible auger 420 moves the biosolids 15 to a belt driven dryer 300. The reversible auger 420 may be selectively reversed to convey biosolids 15 to pelletizer 310 where the biosolids are formed into pellets 315.

In one embodiment, prior to pelletizing, additional fertilizer may be added to the biosolids 15. A water absorbent polymer may optionally be added to form a custom pellet 315. The pellets 315 are conveyed into pellet cooler 350 where atmospheric air is drawn through the pellets 315. Once through the cooling chamber 350, a fourth conveyor 360 moves pellets 315 to a hopper 370. Hopper 370 may comprise a truck, sacks, or other bagging equipment.

Once the pellets come out of the pelletizer, they will be 175° F. or hotter. To avoid internal combustion of the pellets 315 during storage they may need to be cooled. From the pelletizer 310, fourth conveyor 340 transports pellets 315 to pellet cooler 350 where 2,600 cubic feet per minute (CFM) of fresh room air is pulled through the cooling chamber 350 lowering the temperature of the pellets 315. Once cooled, a fifth conveyor 360 transports pellets 315 to a second hopper 370 where they can be stored or unloaded into super sacks, trucks, or bags. Second hopper 370 may comprise or be operatively connected to scales 380 to weigh the biosolids for potential sale to the market.

When the biosolids 15 complete the foregoing process, they are at least 90% solid, which qualifies as a Class A status as determined by the Federal EPA Part 503 regulations. The biosolids 15 may then be sold as a Class A fertilizer. Another use would be as an alternative energy source for incineration processes.

I claim:

1. A system for converting biosolids to fertilizer comprising:
   a. a storage tank for holding biosolids,
   b. a conveyor and a pressurized screen, wherein the conveyor is operably connected to the storage tank and to the pressurized screen, wherein the conveyor transports the biosolids from the storage tank to the pressurized screen, wherein the pressurized screen selectively eliminates debris from the biosolids,
   c. a second conveyor and a centrifuge, wherein the second conveyor is operably connected to the pressurized screen to convey the biosolids to the centrifuge, wherein the centrifuge removes water from the biosolids,
   d. a third conveyor, a feeding chamber, a self-leveling conveyor, a nip feeder, a nip, and first and second dryer drums, wherein the third conveyor is operably connected to the centrifuge to convey the biosolids to the feeding chamber, the self-leveling conveyer is positioned in the feeding chamber, wherein the self-leveling conveyor delivers the biosolids to the nip feeder operatively positioned in the feeding chamber, wherein the nip feeder comprises a main bar that is activated to selectively move away from and toward the nip so that biosolids move from the feeding chamber to the nip, wherein the nip is a gap between the first and second dryer drums, e. the first and second dryer drums operatively positioned to rotate and draw biosolids from the nip feeder into the nip, wherein a first scraper is operably positioned to remove biosolids from the first dryer drum and a second scraper is operably positioned to remove biosolids from the second dryer drum as the first and second dryer drums rotate, and a boiler that provides steam to selectively heat the first and second dryer drums, f. a fourth conveyor and a pelletizer, wherein a portion of the fourth conveyor is positioned underneath the first and second dryer drums to collect the biosolids after they pass through the nip and the fourth conveyor transports the biosolids to the pelletizer, wherein the pelletizer forms the biosolids into pellets, g. a fifth conveyor and a cooling chamber, wherein the fifth conveyor is operably connected to the pelletizer to convey the pellets to the cooling chamber.

2. The system of claim 1 further comprising a polymer tank herein the polymer tank delivers a polymer to the biosolids as the biosolids are conveyed from the pressurized screen to the centrifuge.

3. The system of claim 1 wherein the self-leveling conveyor comprises a ribbon screw conveyor.

4. The system of claim 1 further comprising a mixing chamber operatively positioned between the first and second dryer drums and the pelletizer, wherein the mixing chamber introduces a fertilizer to the biosolids before the pelletizer forms the pellets.

5. The system of claim 4 wherein the mixing chamber delivers a water absorbent polymer to the biosolids before the pelletizer forms the pellets.

6. The system of claim 1 wherein the third conveyor is a screw auger.

7. The system of claim 1 wherein the nip feeder further comprises at least two support rails.

8. The system of claim 1 further comprising a bottom screw auger, wherein the bottom screw auger is positioned below the first and second dryer drums.

9. The system of claim 1 wherein the nip feeder further comprises a hydraulic ram.

10. The system of claim 1 wherein the third conveyor is a loop screw conveyor.

11. The system of claim 1 wherein the third conveyor is a shaftless conveyor.

* * * * *